TRANSISTOR SWITCH

Filed Dec. 3, 1965

United States Patent Office 3,424,922

Patented Jan. 28, 1969

3,424,922

TRANSISTOR SWITCH

Anders Gustaf Lydén, Jakobsberg, Sweden, assignor to Aktiebolaget Atomenergi, Stockholm, Sweden Filed Dec. 3, 1965, Ser. No. 511,525

Claims priority, application Sweden, Dec. 3, 1964, 14,614/64

U.S. Cl. 307—241 10 Claims

Int. Cl. H03k *17/02*

Figure 1:
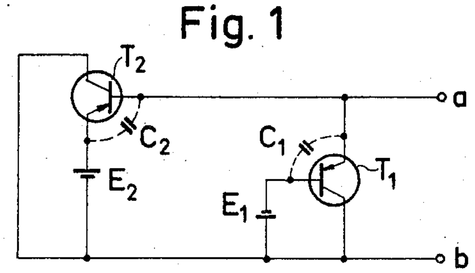

The present invention relates to a transistorized electric circuit arrangement for closing and breaking an electric circuit.

In the same manner as a relay can be used for breaking and closing an electric circuit depending on the magnitude of the current supplied to the relay winding a transistor can when driven in a suitable manner be brought to carry out such a breaking and closing operation. In this kind of application the transistor has advantages as well as drawbacks in comparison with the relay. Thus, the transistor is for instance more rapid in operation and has also a longer life than the relay. On the other hand, the switching characteristics of the transistor are inferior to those of the relay. The transistor does namely not as the relay permit a substantially ideal breaking and closing of a circuit. This depends on the one hand on the voltage, normally called offset voltage or bottoming voltage, appearing across the bottomed transistor and on the other hand on the leakage current passing through the transistor when this is in cut-off state. Another drawback of the transistor is to be found in the transient oscillations occurring immediately upon each closing and breaking operation of the transistor. These transients have normally the shape of short pulses with steep leading edge and exponentially falling trailing edge and are normally more troublesome than the leakage currents occurring when the transistor is cut off.

When the transistor is used for breaking and closing low currents, as for instance usually is the case in so called chopper amplifiers, it is advantageous to arrange the transistor in inverse connection since the bottoming voltage as well as the leakage current can hereby be considerably reduced.

In order to eliminate the bottoming voltage of a transistor serving as a switch it has been proposed to connect to the emitter of the inverted transistor the base of a second transistor (compensating transistor) supplying to the emitter of the first-mentioned transistor the required current for reducing the bottoming voltage to zero.

The invention has for its object to provide an improved driving circuit for an electric circuit arrangement of the kind serving to close and break an electric circuit and comprising a first transistor adapted to be connected into the last-mentioned circuit with its emitter and collector in order to close and break the current through this circuit depending upon the base current of said transistor and a second transistor which is at least approximately identically equal to said first transistor and has its base connected to the emitter of the first transistor and its collector connected to the collector of the first transistor.

The circuit arrangement according to the invention is primarily characterized by a controllable driving circuit comprising an amplifier adapted to maintain between the base and collector of the first transistor a voltage having the same magnitude and sign (polarity) as the voltage simultaneously appearing across the collector and emitter of the second transistor.

The amplifier can preferably be of the phase inverting type and have an input connected between the emitter and collector of the second transistor and a low-ohmic output connected between the base and collector of the first transistor.

The amplifier may consist of a D.C. voltage amplifier or an A.C. voltage amplifier. In the last-mentioned case the amplifier can have the shape of a transformer. In both cases the required controlling signals may be supplied to the input of the amplifier. However, when an A.C. voltage amplifier is used, it may be preferred to provide the circuit arrangement with separate means for current supply to the base of the first transistor and to the emitter of the second transistor. In this case the two above-mentioned electrodes can be connected to the junction point of the collectors of the first and second transistors each through one further transistor adapted to serve as a switch. The controlling signals may then be supplied to the base electrodes of the two further transistors.

According to another embodiment of the invention the amplifier can have one input receiving the controlling signals and two symmetrical outputs, one of said outputs being connected between the base and collector of the first transistor while the other output is connected between the emitter and collector of the second transistor.

Figure 2:
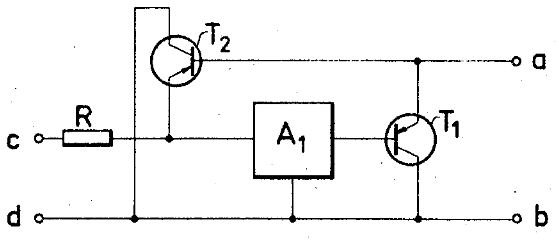
Figure 3:
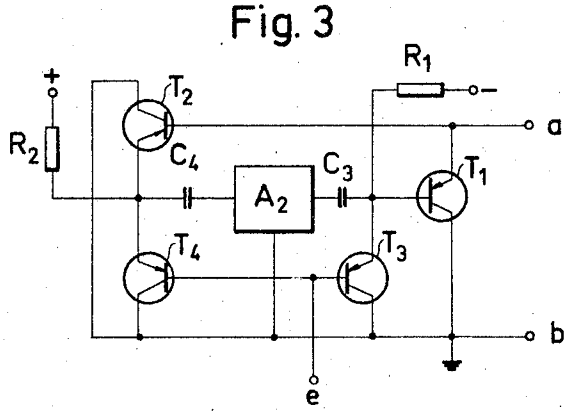
Figure 4:
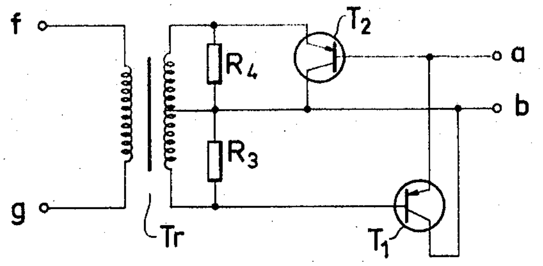

The invention will now be described more in detail with reference to the accompanying drawing in which:

FIGURE 1 is a schematic circuit diagram showing a switch transistor provided with a compensating transistor; and FIGURES 2, 3 and 4 are circuit diagrams showing the circuit arrangement according to FIGURE 1 provided with different types of driving circuits.

The circuit arrangement shown in FIGURE 1 comprises two transistors $T_1$ and $T_2$ of which transistor $T_1$ serves as a switch for closing and breaking an outer circuit (not shown) which is connected to the emitter and collector of transistor $T_1$ over two terminals *a* and *b*, respectively. Transistor $T_2$ has for its object to supply to the emitter of transistor $T_1$ the required current for reducing the bottoming voltage of the last-mentioned transistor to zero. For this purpose the base of transistor $T_2$ is connected to the emitter of transistor $T_1$ which is in turn connected to terminal *a*. The collectors of the two transistors $T_1$ and $T_2$ are connected in common to terminal *b*. The base and collector of transistor $T_1$ are coupled to a first D.C. voltage source $E_1$ while the emitter and collector of transistor $T_2$ are connected to a second D.C. voltage source $E_2$. In FIGURE 1 the base-emitter depletion layer capacitances $C_1$ and $C_2$, respectively, of the two transistors $T_1$ and $T_2$ have been shown in broken lines.

It is presumed that the two transistors are identically equal which means that the depletion layer capacitance $C_1$ of transistor $T_1$ is equal to the depletion layer capacitance $C_2$ of transistor $T_2$. This requirement is a prerequisite for the elimination of transient oscillations at the closing and breaking moment. In order to reduce the bottoming voltage of transistor $T_1$ to zero it is necessary to adjust the voltage sources $E_1$ and $E_2$ so that their output voltages are exactly equal. This requirement is comparatively sharp since already small differences between said voltages will cause the bottoming voltage of transistor $T_1$ to diverge from zero. The voltages supplied by the voltage sources $E_1$ and $E_2$ will be in the order of 0.5 volt during the closing operation of the switch while at breaking operation said voltages will normally assume zero value. A more detailed explanation of the theoretical background of the circuit arrangement shown in FIGURE 1 will be found in "Aktiebolaget Atomenergi Report 121, Stockholm, 1963."

FIGURE 2 shows a modified embodiment of the circuit arrangement according to FIGURE 1 wherein the two voltage sources $E_1$ and $E_2$ in FIGURE 1 have been replaced by a driving circuit comprising a D.C. voltage amplifier $A_1$ having an input connected to the emitter of transistor $T_2$ and an output coupled to the base of transistor $T_1$. The control signal for the driving circuit is supplied to two terminals *c* and *d* from which said signal is transmitted to the input of amplifier $A_1$ through a resistor R. Since it is desired that the output voltage of amplifier $A_1$ shall assume the same magnitude as the input voltage of the amplifier but the opposite polarity the amplifier must have the amplification $-1$, i.e. the amplifier has to function as a phase inverter. Further, the output of amplifier $A_1$ must be low-ohmic in order to permit the required driving current to be fed to transistor $T_1$. For the purpose of eliminating transient oscillations the amplifier has also to function without delay and to provide a stable amplification. Moreover, in order to secure that the bottoming voltage of transistor $T_1$ remains at zero the amplifier must have a negligible drift and perform the abovementioned requirement on stable amplification.

The amplifier $A_1$ shown in FIGURE 2 may be replaced by a D.C. voltage amplifier having two symmetrical outputs, one coupled to the base of transistor $T_1$ and the other to the emitter of transistor $T_2$. In such a case the control signals are supplied to the input of the amplifier, which delivers at one output a voltage having the same polarity as the input voltage and at the other output a voltage of the opposite polarity.

FIGURE 3 illustrates another embodiment of the driving circuit comprising an A.C. voltage amplifier $A_2$ with the amplification $-1$. This amplifier has a low-ohmic output which is coupled to the base of transistor $T_1$ through a capacitor $C_3$, and an input connected to the emitter of transistor $T_2$ through another capacitor $C_4$. The two capacitors $C_3$ and $C_4$ should have sufficiently high capacitance values to secure that the impedances formed by said capacitors can be considered negligible. The driving current to transistor $T_1$ is supplied to the base of said transistor through a resistor $R_1$ which is connected to the negative terminal of a D.C. voltage source having a grounded positive terminal, while the driving current to transistor $T_2$ is supplied to the emitter of said transistor through a resistor $R_1$ coupled to the positive terminal of a second D.C. voltage source the negative terminal of which is grounded. In order to make it possible to bring the two transistors $T_1$ and $T_2$ into cut-off state the circuit arrangement according to FIGURE 3 is provided with two further mutually equal transistors $T_3$ and $T_4$, which in the embodiment illustrated in FIGURE 3 are assumed to consist of PNP-transistors but may be replaced by NPN-transistors. Transistor $T_3$ has its emitter connected to the base of transistor $T_1$ while transistor $T_4$ has its emitter coupled to the emitter of transistor $T_2$, i.e. to the junction point between resistor $R_2$ and capacitor $C_4$. The collectors of the two transistors $T_3$ and $T_4$ are connected to the junction point between the collectors of transistors $T_1$ and $T_2$ while the bases of transistors $T_3$ and $T_4$ are connected in common to a terminal *e*. The two transistors $T_3$ and $T_4$, each functioning as a transistor switch, serve to bypass the driving current to transistors $T_1$ and $T_2$ and to cut off said transistors during time intervals determined by the input signal supplied to terminal *c*.

In the foregoing description it has been presumed that the amplifier $A_1$ or $A_2$, respectively, has its input coupled to the emitter of transistor $T_2$ and its output connected to the base of transistor $T_1$. However, it is clear that the desired function of the circuit arrangement will be obtained also with an amplifier in inverted connection, i.e. with the input of the amplifier connected to transistor $T_1$ and the output to transistor $T_2$. However, in such a case the resistor R in the circuit arrangement shown in FIGURE 2 has to be connected to the base of transistor $T_1$ and not to the emitter of transistor $T_2$.

FIGURE 4 shows a circuit arrangement comprising a driving circuit having a transformer *Tr* with a differential output. As appears from the drawing, said transformer has a center-tapped secondary winding the center tapping of which is connected to the junction point between the collectors of the two transistors $T_1$ and $T_2$, while the outer ends of the secondary winding are coupled to the emitter of transistor $T_2$ and to the base of transistor $T_1$, respectively. Moreover, the two winding sections of the secondary winding of transformer *Tr* are each connected in parallel with a resistor $R_3$ and $R_4$, respectively. When the driving circuit is arranged as above described the driving voltage of the two transistors does not assume zero value when the transistors are in cut-off state. Instead the driving voltage of the transistors in cut-off state is equal to the driving voltage of the transistors in on-state but of the opposite polarity.

Above it has been presumed that all transistors are of PNP-type. However, the invention does, of course, also cover corresponding circuit arrangements using NPN-transistors as well as any other semiconductor devices that may be used for the above described purpose, e.g. so-called field effect transistors or unipolar transistors.

Moreover, it should be noted that a circuit arrangement according to the invention may preferably be entirely or partly built up in the shape of one or more integrated circuits. For instance, the two transistors $T_1$ and $T_2$ and the amplifier $A_2$ (FIGURE 2) may be combined into a single integrated circuit.

What is claimed is:

1. A switching means for opening and closing a controlled, electrical circuit, comprising:

(a) first transistor means having its emitter and its collector connected to said controlled circuit;

(b) second transistor means having its base connected to said emitter of said first transistor and its collector connected to said collector of said first transistor; and (c) a controllable, driving circuit, including amplifier means connected to the base and said collector of said first transistor and to the emitter and said collector of said second transistor, and adapted to maintain a voltage between said base and said collector of said first transistor of equal magnitude and of the same polarity as the voltage appearing between said collector and said emitter of said second transistor.

2. A switching means in accordance with claim 1 wherein the amplifier is a phase inverter.

3. A switching means in accordance with claim 2 wherein the input of the phase inverter is connected to the emitter and the collector of the second transistor and the output of said phase inverter is connected to the base and the collector of the first transistor.

4. A switching means in accordance with claim 2 wherein the input of the phase inverter is connected to the base and the collector of the first transistor and the output of said phase inverter is connected to the emitter and the collector of the second transistor.

5. A switching means in accordance with claim 1 wherein the amplifier means has a single input and two symmetrical outputs, a first of said outputs is connected to the base and the collector of the first transistor and the second of said outputs is connected to the emitter and the collector of the second transistor.

6. A switching means in accordance with claim 1 wherein the amplifier means is a DC voltage amplifier adapted to be supplied with the required control signal for the circuit at its input.

7. A switching means in accordance with claim 1 wherein the amplifier means is an AC voltage amplifier.

8. A switching means in accordance with claim 7 wherein the base of the first transistor is connected to a first external current source, the emitter of the second transistor is connected to a second external current source, a third transistor means has its emitter and its collector connected to said base and said collector, respectively, of said first transistor, a fourth transistor means has its emitter and its collector connected to said emitter and said collector, respectively, of said second transistor, and the bases of said third and said fourth transistors are adapted to be connected to a common, external control signal.

9. A switching means in accordance with claim 1 wherein the amplifying means is a transformer.

10. A switching means in accordance with claim 9 wherein the transformer has two equal secondary winding sections, one end of each of said two secondary winding sections is connected to the collectors of the first transistor and of the second transistor, the other end of one of said secondary winding sections is connected to the emitter of said second transistor and the other end of the other of said secondary winding sections is connected to the base of the first transistor and the primary of said transformer is adapted to be connected to an external control signal.

References Cited

UNITED STATES PATENTS

| | | | |
|---|---|---|---|
| 3,160,807 | 12/1964 | Packard | 307—254 X |
| 3,211,928 | 10/1965 | Baron et al. | 307—254 X |
| 3,274,446 | 9/1966 | Nagata | 307—315 X |

ARTHUR GAUSS, *Primary Examiner.*

DONALD D. FORRER, *Assistant Examiner.*

U.S. Cl. X.R.

307—251, 253